May 10, 1938.  J. K. DIAMOND  2,117,153
BELT AND TAPE CUTTING MACHINE
Filed Jan. 15, 1936   2 Sheets-Sheet 1
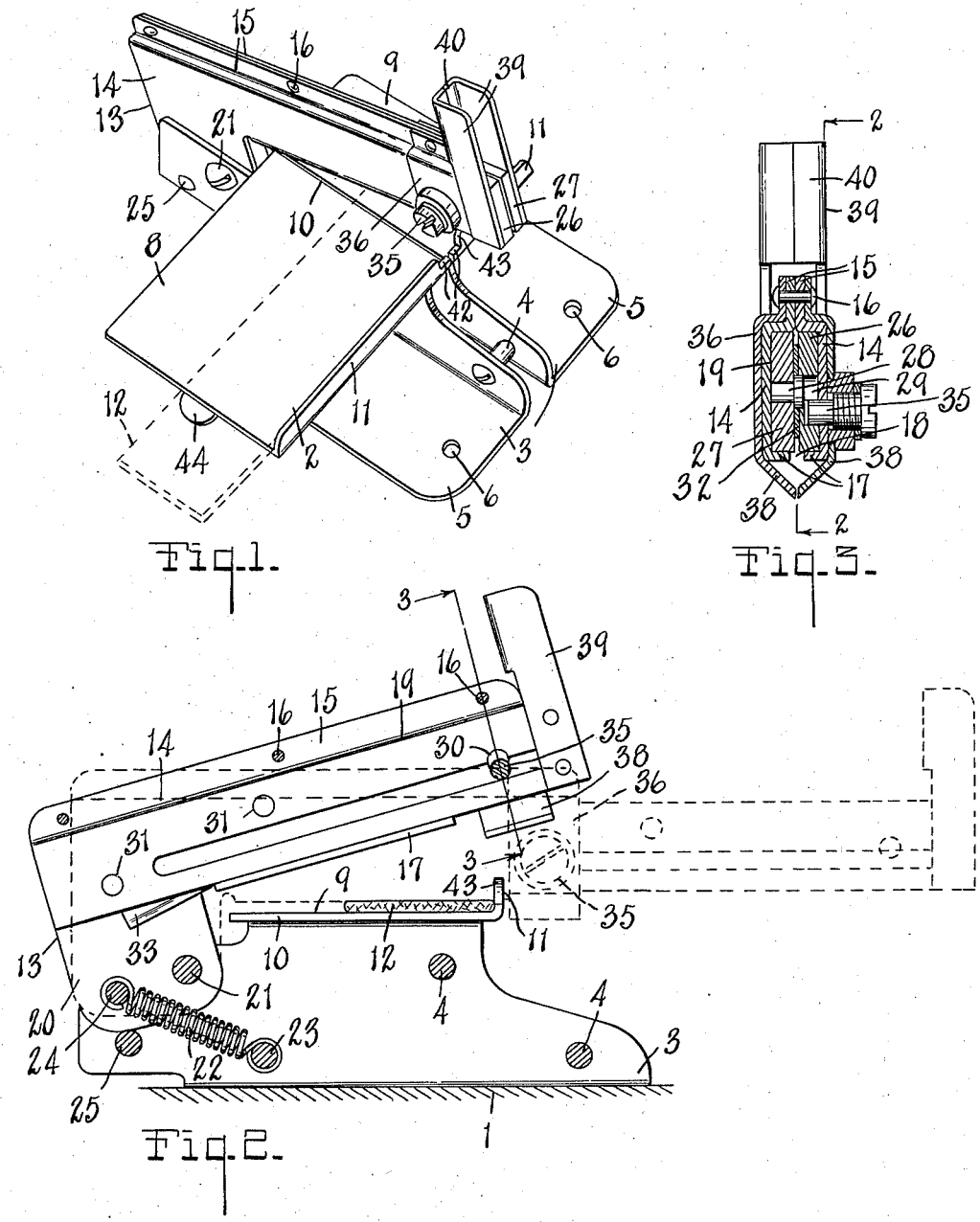
INVENTOR.
James K. Diamond
BY
Chappell, Earl, Chappell
ATTORNEYS May 10, 1938.  J. K. DIAMOND  2,117,153
BELT AND TAPE CUTTING MACHINE
Filed Jan. 15, 1936  2 Sheets-Sheet 2

INVENTOR.
James K. Diamond
BY
ATTORNEYS

Patented May 10, 1938

2,117,153

UNITED STATES PATENT OFFICE 2,117,153

BELT AND TAPE CUTTING MACHINE

James K. Diamond, Grand Rapids, Mich., assignor to Clipper Belt Lacer Company, Grand Rapids, Mich.

Application January 15, 1936, Serial No. 59,215

7 Claims. (Cl. 164—73)

The main objects of this invention are:

First, to provide a belt and tape cutting machine which is well adapted for use in cutting woven or fabric belts such as are largely used on spinning machines and the like.

Second, to provide a machine of this character which results in a clean cut transversely of the belt without raveling or pulling the strands of the belt.

Third, to provide a cutting and trimming machine adapted for the cutting of belts and tapes which is efficient for the purpose and at the same time is very economical in its parts and convenient to use.

Objects relating to details and economies of my invention will appear from the description to follow. The invention is defined and pointed out in the claims.

A preferred embodiment of my invention is illustrated in the accompanying drawings, in which:

Fig. 1 is a perspective view of a machine embodying the features of my cutting and trimming machine, a piece of belt being indicated on the table by dotted lines.

Fig. 2 is a view partially in transverse section with the combined cutting bar and work holder member shown in retracted position by full lines and in actuated position with the cutter bar fully actuated by dotted lines, a piece of work being shown on the table.

Fig. 3 is a transverse section through the holder member or cutter bar on line 3—3 of Fig. 2, certain parts being shown in section and the cutter bar being shown in its forward position.

Figure 4:
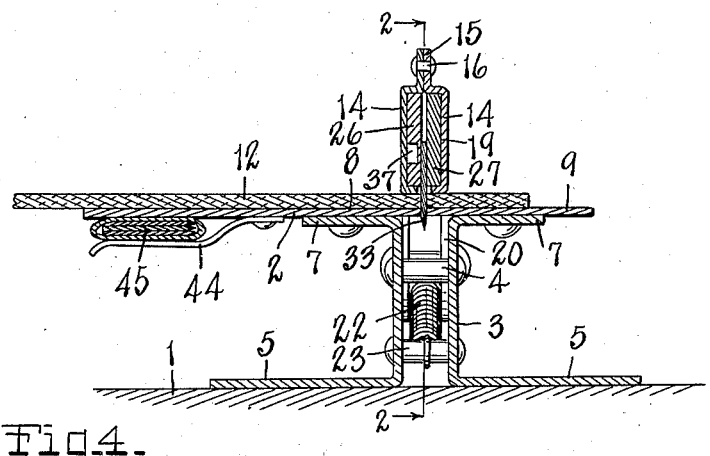
Fig. 4 is a fragmentary longitudinal section with the work holder and cutter bar member in actuated position, the cutter bar being actuated into work engaging position.
Figure 6:
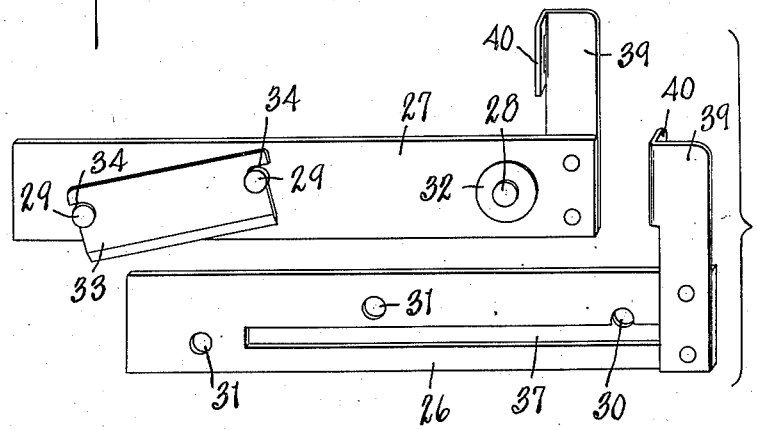
Fig. 6 is a disassembled view of the cutter bar members.
Figure 5:
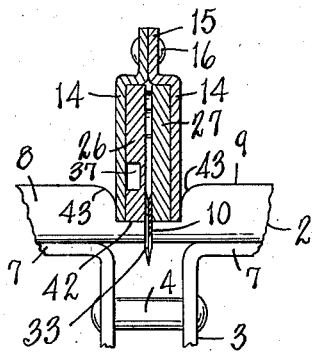
Fig. 5 is a fragmentary front elevation partially in section with the parts in actuated position.

Referring to the drawings, 1 represents a suitable bed or bench on which the device is mounted. In the embodiment of my invention illustrated, I provide a base for the work table designated generally by the numeral 2, the base consisting of a pair of angular base members 3 disposed with their vertical webs in spaced relation, these being rigidly secured in such spaced relation by means of suitable cross members 4. The horizontal webs 5 of the base members are perforated at 6 to receive screws or bolts for attaching to the bench 1. The vertical webs 3 have laterally turned flanges 7 at their upper edges to which the plate-like table members 8 and 9 are secured with their adjacent edges in spaced relation to provide a transverse slot 10 across the table. These table members have upturned flanges or work rests 11 at their front edges, the work 12 being arranged on the table with its front edge in abutting relation to this flange or work rest and so that it extends across the slot, the point at which it is to be severed being brought into registry with the slot.

The combined cutter bar and work holder 13 is, in this embodiment, formed of two channeled sheet metal stampings 14 disposed in opposed relation and having upturned flanges 15 disposed in face to face relation and secured together by rivets 16. The bottom flanges 17 of these holder members are spaced apart to provide a longitudinal slot or opening 18 at the bottom of the slideway 19 formed by the members. These stampings have downwardly projecting arms 20 at their rear ends disposed between the upright webs of the base members and pivoted thereto by the pivot 21.

A spring 22 is engaged with the cross piece 23 on the base members and with a pin 24 at the rear of the pivot 21 so that the spring acts to swing in front of the holder member upwardly to the position shown in Fig. 2, a stop 25 being provided to limit this upward movement.

The cutter bar is, in this embodiment, formed of a pair of bar-like members 26 and 27, the member 27 being provided with a plurality of studs 28 and 29 whereas the member 26 is provided with holes 30 and 31 receiving these studs. A washer-like spacer 32 is arranged on the stud 28. The studs 29 are positioned to receive the cutter blade 33 and support it in a rearwardly inclined position with its edge projecting downwardly from between the cutter bar members. This blade is formed of a flat piece of stock and has notches 34 at its ends receiving the studs 29. In assembling, the blade is positioned on the studs and the member 26 also engaged therewith in which assembled relation the cutter bar is inserted in the slideway 19 which embracing the cutter bar members, holds them in assembled relation and also the cutter.

A stop 35 threaded into a suitable stud provided on the guard member 36 engages the longitudinal groove 37 in one of the cutter bar members limiting the forward stroke of the cutter bar and also retaining it in assembled relation within the slideway. The guard member 36 is formed of stampings to embrace the forward ends of the holder members and has downwardly projecting guard portions 38 which are positioned in front of the table when the cutter bar is fully extended as indicated by dotted lines in Fig. 2. This allows the knife to pass entirely through the work and at the same time prevents the operator coming in contact with the knife when in its fully advanced position.

The cutter bar members are provided with upwardly projecting handhold or finger pieces 39 which are riveted thereto and have complementary flange portions 40 forming a suitable grip so that when the operator pulls on this handhold, the first result is the swinging of the holder member down into work clamping position as shown in Fig. 4 and continued pull will advance the cutter bar and draw the knife along through the slot and cleanly cut the work resting in position on the table.

The work rest is notched at 42 to receive the holder member, the edges of the notch being rounded at 43 so that even when the pull of the operator is not in a direct line as is desirable, the holder is guided into a central position relative to the slot in the work table.

The cutters are economically produced and the table is preferably provided with a holder 44 on its underside adapted to receive a package 45 of the blades.

The embodiment of my invention illustrated is especially designed for the cutting of woven belts or tapes, as they are frequently called, widely used on spinning machines and the like preparatory to lacing or joining the ends thereof by means of belt lacing hooks. It is highly desirable that the cut should be clean and without ravelings as raveling may seriously weaken the joint. Further, it is of advantage to have a machine which may be quickly and easily operated to produce square cuts across the work. The machines are well adapted for heavier work and for the cutting of various objects and materials other than belts where a clean shear cut is desired.

I have illustrated and described my improvements in an embodiment which I have found highly satisfactory. I have not attempted to illustrate or describe certain embodiments or adaptations thereof as it is believed this disclosure will enable those skilled in the art to embody or adapt my improvements as may be desired.

Having thus described my invention, what I claim as new and desire to secure by Letters Patent, is:

1. In a cutting and trimming machine, the combination of a base comprising a pair of angular base members disposed oppositely with their vertical webs in spaced relation, a table comprising a pair of plates mounted on the upper edges of the vertical webs of said base members with the adjacent edges of the plates in spaced relation providing a cutter slot, said plates having upturned flanges on their front edges providing a work fence, a combined cutter bar and work holder member consisting of a pair of channeled stampings disposed in opposed relation providing a longitudinal cutter bar slideway between them, there being a longitudinal slot at the bottom of the said slideway, said holder member having a downwardly projecting pivot arm at the rear end thereof pivoted between the upright portions of said base members, said work fence being recessed to receive said holder member when it is in its work clamping position and constituting positioning means therefor, a spring disposed between said base members and connected to said holder member pivot arm at the rear of its pivot, whereby the spring acts to swing the holder member upwardly to retracted position, a cutter bar slidable in said holder member, a cutter blade on said cutter bar disposed with a portion of its cutting edge projecting downwardly through said slot at the bottom of the slideway when the holder member is in work engaging position, said cutter bar having upwardly projecting handholds at its front end so that a pressure thereon will first swing the holder on its pivot to work clamping position and an immediate following pull will actuate the cutter bar, said holder member at its front end being provided with a depending cutter guard lying in front of the table when the holder member is in actuated position, and a stop on said holder member coacting with a groove in said cutter bar for limiting the stroke of the cutter bar, said stop being removable to permit withdrawal of said cutter bar.

2. In a cutting and trimming machine, the combination of a base comprising a pair of angular base members disposed oppositely with their vertical webs in spaced relation, a table comprising a pair of plates mounted on the upper edges of the vertical webs of said base members with the adjacent edges of the plates in spaced relation providing a cutter slot, said plates having upturned flanges on their front edges providing a work fence, a combined cutter bar and work holder member provided with a cutter bar slideway, there being a longitudinal slot at the bottom of the said slideway, said holder member having a downwardly projecting pivot arm at the rear end thereof pivoted between the upright portions of said base members, said work fence being recessed to receive said holder member when it is in its work clamping position and constituting positioning means therefor, a spring disposed between said base members and connected to said holder member pivot arm at the rear of its pivot, whereby the spring acts to swing the holder member upwardly to retracted position, a cutter bar slidable in said holder member and consisting of a pair of bar-like members, one of which is provided with a plurality of studs and the other with holes receiving said studs when the members are inserted in said slideway, the members being held in assembled relation when inserted in said slideway, a cutter blade disposed between said bar members and notched at its ends to engage a pair of the studs, the knife supporting studs being disposed so that the blade is supported in a rearwardly inclined position with a portion of its cutting edge projecting downwardly through said slot at the bottom of the slideway when the holder member is in work engaging position, said cutter bar having upwardly projecting handholds at its front end so that a pressure thereon will first swing the holder on its pivot to work clamping position and an immediate following pull will actuate the cutter bar, and a stop on said holder member coacting with a groove in said cutter bar for limiting the stroke of the cutter bar, said stop being removable to permit withdrawal of said cutter bar.

3. In a cutting and trimming machine, the combination of a table having a transverse slot and provided with a work fence at the front thereof, a combined cutter bar and work holder member pivoted at its rear end and consisting of a pair of channeled members disposed in opposed relation providing a longitudinal cutter bar slideway between them, there being a longitudinal slot at the bottom of the said slideway, a cutter bar slidable in said holder member and consisting of a pair of bar-like members, one of which is provided with a plurality of studs and the other with holes receiving said studs when the members are inserted in said slideway, the members being held in assembled relation when inserted in said slideway, a cutter blade disposed between said bar members and notched at its ends to engage a pair of the studs, the knife supporting studs being disposed so that the blade is supported in a rearwardly inclined position with a portion of its cutting edge projecting downwardly through said slot at the bottom of the slideway, said cutter bar having handholds at its front end disposed so that a pressure thereon will first swing the holder on its pivot to work clamping position and an immediate following pull will actuate the cutter bar, said holder member at its front end being provided with a depending cutter guard lying in front of the table when the holder member is in actuated position, and a stop on said holder member for limiting the stroke of the cutter bar, said stop being removable to permit withdrawal of said cutter bar.

4. In a cutting and trimming machine, the combination of a table having a transverse slot and provided with a work fence at the front thereof, a combined cutter bar and work holder member pivoted at its rear end and consisting of a pair of channeled members disposed in opposed relation providing a longitudinal cutter bar slideway between them, there being a longitudinal slot at the bottom of the said slideway, a cutter bar slidable in said holder member, a cutter blade on said cutter bar, said cutter bar having handholds at its front end disposed so that a pressure thereon will first swing the holder on its pivot to work clamping position and an immediate following pull will actuate the cutter bar, said holder member at its front end being provided with a depending cutter guard lying in front of the table when the holder member is in actuated position, and a stop on said holder member for limiting the stroke of the cutter bar, said stop being removable to permit withdrawal of said cutter bar.

5. In a cutting and trimming machine, the combination of a table having a transverse slot and provided with a work fence at the front thereof, a combined cutter bar and work holder member pivoted at its rear end, a cutter bar slidable in said holder member, a cutter blade on said cutter bar, said cutter bar having handholds at its front end disposed so that a pressure thereon will first swing the holder on its pivot to work clamping position and an immediate following pull will actuate the cutter bar, and a stop on said holder member for limiting the stroke of the cutter bar, said stop being removable to permit withdrawal of said cutter bar.

6. The combination of a work table having a transverse slot therein and provided with an upwardly projecting work fence at its front edge, a combined cutter bar and work holder member pivotally mounted at its rear end to swing in the plane of said slot, the work fence being recessed to receive and laterally support said holder member when it is in its actuated position, a spring acting to swing said holder member to unactuated position, a cutter bar mounted in said holder member for reciprocatory movement longitudinally thereof, said cutter bar having a handhold at its front end positioned so that a pressure thereon will first actuate the holder member to work engaging position and an immediate following pull will actuate the cutter bar, and a cutter carried by said cutter bar and projecting from the bottom of said holder member.

7. The combination of a work table having a transverse slot therein and provided with an upwardly projecting work fence at its front edge, a combined cutter bar and work holder member pivotally mounted at its rear end to swing in the plane of said slot, the work fence being recessed to receive and laterally support said holder member when it is in its actuated position, a cutter bar mounted in said holder member for reciprocatory movement longitudinally thereof, and a cutter carried by said cutter bar and projecting from the bottom of said holder member.

JAMES K. DIAMOND.